United States Patent [19]

Steely, Jr. et al.

[11] Patent Number: 5,235,697
[45] Date of Patent: Aug. 10, 1993

[54] SET PREDICTION CACHE MEMORY SYSTEM USING BITS OF THE MAIN MEMORY ADDRESS

[75] Inventors: Simon C. Steely, Jr., Hudson, N.H.; John H. Zurawski, Boxboro, Mass.

[73] Assignee: Digital Equipment, Maynard, Mass.

[21] Appl. No.: 956,827

[22] Filed: Oct. 5, 1992

Related U.S. Application Data

[63] Continuation of Ser. No. 546,509, Jun. 29, 1990, abandoned.

[51] Int. Cl.$^5$ .................... G06F 12/12; G06F 12/10
[52] U.S. Cl. ..................... 395/425; 364/DIG. 1; 364/243.45
[58] Field of Search ........................................ 395/425

[56] References Cited

U.S. PATENT DOCUMENTS

| | | | |
|---|---|---|---|
| 4,430,706 | 2/1984 | Sand | 364/200 |
| 4,583,165 | 4/1986 | Rosenfeld | 364/200 |
| 4,618,926 | 10/1986 | Kubo et al. | 364/200 |
| 4,695,949 | 9/1987 | Thatte et al. | 364/200 |
| 4,736,287 | 4/1988 | Druke et al. | 364/200 |
| 4,736,293 | 4/1988 | Patrick | 364/200 |
| 4,760,520 | 7/1988 | Shintani et al. | 364/200 |
| 4,905,188 | 2/1990 | Chuang et al. | 364/900 |
| 5,014,195 | 5/1991 | Farrell et al. | 364/200 |

OTHER PUBLICATIONS

Chang, et al., *The 14th Annual International Symposium on Computer Architecture*, "Cache Design of a Sub-Micron CMOS System/370", Jun. 1987, pp. 208–213.

*Primary Examiner*—Lawrence E. Anderson
*Attorney, Agent, or Firm*—Kenyon & Kenyon

[57] ABSTRACT

The set-prediction cache memory system comprises an extension of a set-associative cache memory system which operates in parallel to the set-associative structure to increase the overall speed of the cache memory while maintaining its performance. The set prediction cache memory system includes a plurality of data RAMs and a plurality of tag RAMs to store data and data tags, respectively. Also included in the system are tag store comparators to compare the tag data contained in a specific tag RAM location with a second index comprising a predetermined second portion of a main memory address. The elements of the set prediction cache memory system which operate in parallel to the set-associative cache memory include: a set-prediction RAM which receives at least one third index comprising a predetermined third portion of the main memory address, and stores such third index to essentially predict the data cache RAM holding the data indexed by the third index; a data-select multiplexer which receives the prediction index and selects a data output from the data cache RAM indexed by the prediction index; and a mispredict logic device to determine if the set prediction RAM predicted the correct data cache RAM and if not, issue a mispredict signal which may comprise a write data signal, the write data signal containing information intended to correct the prediction index contained in the set prediction RAM.

11 Claims, 3 Drawing Sheets

SET PREDICTION CACHE MEMORY SYSTEM USING BITS OF THE MAIN MEMORY ADDRESS

This is a continuation of application Ser. No. 07/546,509 filed on Jun. 29, 1990, now abandoned.

FIELD OF THE INVENTION

The present invention relates to a set prediction cache memory system. More specifically, the invention relates to an improvement of cache memory performance through the use of a set prediction RAM memory. Furthermore, this invention relates to the reduction of computer latency in data processing systems employing cache memory.

BACKGROUND OF THE INVENTION

The development of data processing systems has brought with it the demand for higher speed computers such that these computers can access, process, and output data with greater proficiency. Modern day computer systems frequently comprise a central processing unit (CPU) and a memory hierarchy including a relatively large, albeit slow, main memory module and a smaller, but faster, cache memory. In such systems, the cache memory is physically situated between the central processing unit and the main memory module, as a temporary storage device for current data and instructions being processed by the central processing unit. The use of a relatively fast cache memory device as a temporary storage medium allows for an overall increase in computer system speed.

The use of a cache memory is based upon the principles of temporal locality and spatial locality. More specifically, when a CPU is accessing data and instructions from a particular space within physical memory, it will most probably access the data and instructions from that space and also, access data and instructions from contiguous space, for a certain period of time. Accordingly, data blocks within the contiguous space of physical memory where data being utilized by the central processing unit resides, are placed in the cache memory to greatly decrease the time required to fetch data and instructions from frequently referred to data items within such data blocks.

Accessing data in a memory has been a notorious source of computer latency dependent upon the type of memory employed. The inherent latency of memory systems results from the process of indexing a particular data item within a data block within a memory system, and then accessing that same data item when such is required by the system.

A common method of accessing a particular data item within a data block in a cache memory has been through a direct-mapped cache memory system, wherein each particular data item stored in the cache memory is located by an index comprising a predetermined number of bits of its main memory address (usually some set of low order bits). Accordingly, when a particular data item is required for processing, the index is used to fetch the data item from the cache memory.

An alternative to the direct-mapped system for a computer cache memory, is a set-associative cache memory system, which comprises a set of cache data RAMS for data storage and a corresponding set of tag RAMS for storage of tags corresponding to the main memory addresses of the data items stored in the data RAMS.

A particular data item can be stored in any one of the set of data RAMS. Each data RAM is paired with one of the tag RAMS for storage of the tags corresponding to the main memory addresses of the data items stored in the respective data RAM. The location of the particular data item within a data RAM is identified by an index derived from the data item's main memory address, as in a directly mapped cache.

When the computer system wants to fetch the particular data item, the index is input into each data RAM/tag RAM pair. Each data RAM/tag RAM pair outputs a data item and its respective tag. At the same time, the tag of the main memory address for the particular data item to be fetched is input to comparison logic for comparison with each of the tags output by the tag RAM's. Assuming that the data item to be fetched is in one of the data RAMS, the tag output by the tag RAM paired to that data RAM where the particular data item resides will match the tag of the data item input to the comparison logic and the comparison logic will output the data item from that data RAM.

Each of the known cache memory systems has specific benefits and known disadvantages. For example, a direct mapped system for a computer cache memory is known to be relatively fast in fetching data corresponding to a specific main memory address. Although a direct mapped system includes comparison logic to determine if the data item selected is contained in the cache, such comparison logic is for a comparison of a single address to a single tag. Thus, the data item is available for use by the CPU prior to completion of the tag comparison making the direct mapped system faster than a set-associative system. A direct-mapped system will, however, always write over data with the same index associated with it, resulting in a lower hit rate for data fetches from cache memory.

A set-associative cache memory system conversely, has a higher hit rate because each data block, containing data items, stored in the set associative cache is placed in only one of a set of data RAMs and a replacement algorithm can be used to make certain that subsequent data blocks, having the same index, are placed in data blocks not recently accessed or even in a random location. However, the need to wait for the comparison logic to determine which one of the set of data RAMs contains a particular data item makes the set-associative cache memory system a relatively slow system compared to a direct mapped system.

Other than its use of comparison logic, the problem with the set-associative scheme is that it needs to have the tag RAMS near the cache data RAMS in order to select the correct data from the possibilities supplied by the set of data RAM's. Single chip microprocessors employing on-board RAM are disadvantaged by this proximity requirement as valuable chip area is needed by the tag RAMs. Such chip area could be utilized to implement a larger data cache, thereby increasing the amount of data that can be stored for improved cache performance.

With regard to the speed and performance of the computer cache memory, it is desirable to achieve a system configuration which combines the speed of the direct-mapped system and the high hit rate obtainable through the use of a set-associative cache memory system. Ideally then, the speed of a direct-mapped system would have to be combined with the performance (hit rate) of the set-associative system.

SUMMARY OF THE INVENTION

The present invention provides a set-associative cache memory system including a prediction device for predicting the location of a requested data item within the set-associative cache memory system. The set prediction cache memory system according to the invention comprises a prediction unit such as a RAM, a data-select multiplexer, a plurality of data RAMs, a corresponding plurality of tag RAMs, a plurality of tag comparators and a mis-predict logic. Each data RAM may comprise, for example, a memory storing a kilobyte of data arranged as sixteen memory blocks of 64 bytes each.

The set prediction cache memory system receives a main memory address which is segmented into a plurality of indices, each index comprising a predetermined number of bits of the main memory address. Each data item is a subset of a data block in each data RAM and is addressable by a first index, which comprises a predetermined first portion of the main memory address of the data item.

Each of the tag RAMs corresponds to one of the data RAMs (i.e., a first tag RAM is paired with and carries tag entries for data blocks stored in a first data RAM). The individual tags in the tag RAMs are each addressable by a second index which comprises a predetermined second portion of the main memory address of a respective data item. But in contrast to prior art set-associative cache memories, such tag RAMs are separate electronic entities within the system and can be located off-chip.

The set-prediction RAM receives a third index which comprises a predetermined third portion of the main memory address of a data item, and based on that third index, outputs a prediction index corresponding to one of the data RAMs.

The data-select multiplexer is arranged to receive the prediction index from the set-prediction RAM as a select line control to select the data block stored in a memory location addressed by the first index in the one data RAM identified by the prediction index, for output to and immediate use by the CPU, prior to completion of a tag comparison. The prediction RAM initially contains bogus prediction indices and is "trained" or updated by operation of the mis-predict logic to contain correct prediction indices. The prediction RAM, as trained by the mis-predict logic, will eventually contain accurate prediction indices due to the principle of locality discussed above.

The plurality of tag comparators each receive a respective tag output by a respective tag RAM, as well as a fourth index that is the tag for the data item to be fetched and which comprises a predetermined corresponding fourth portion of the main memory address of the data item. Each tag comparator compares the input tag to the fourth index to determine if a match exists. The output of each such comparison, either a hit or a miss, is then output to the mis-predict logic.

The mis-predict logic receives as inputs a hit or miss signal from each of the plurality of tag comparators as well as the prediction index from the set prediction RAM. The mis-predict logic is essentially a check on the accuracy of the set prediction RAM to update the content of the prediction RAM for improved accuracy of operation. The mis-predict logic will generate a mis-predict signal in the situation where the set prediction RAM has predicted a data RAM that does not correspond to the tag RAM having a hit, as determined by the plurality of tag comparators. When a mis-predict signal is generated, the CPU will return to the state just prior to accepting the data from the incorrect data RAM through the use of known trap logic. At the same time, the number of the correct data RAM is written into the prediction RAM to "train" the prediction RAM. Once the set prediction RAM is trained with the correct prediction index and once the CPU has been notified of the existence of a mispredict, the CPU will return and again request the same data item.

The set prediction cache memory system according to the present invention allows for parallel operation of data retrieval from the data RAMS and tag comparators. The existence of parallel operations permits the CPU to immediately use the data from the predicted data RAM, before completion of the tag comparison but subject to later receipt of a mis-predict signal indicative of an incorrect prediction by the set prediction RAM.

The set prediction cache memory system may also comprise several off-chip buffers to facilitate the immediate use of data from the predicted data RAM. Such buffers may comprise registers to accept the respective indices (for example, second, fourth and prediction indices) from on-chip components to allow such on-chip devices to receive and process more information without having to wait for off-chip components to complete their respective tag comparisons and checks. Such buffers serve a secondary purpose of delaying the information received such that buffer outputs coincide, with respect to real time, with the outputs of other off-chip components.

The present invention does not limit the size or the number of individual data RAMs. It is preferable however to have a set prediction RAM which is much larger, in terms of prediction RAM locations, than the total number of data blocks stored in the cache memory system, for example, four to eight times larger. The minimum size for the set prediction RAM corresponds to the number of cache memory address locations equal to the total number of data items in one data RAM.

The greater the number of bits comprising the third index, the greater the probability of a successful prediction from the set prediction RAM. The larger the third index is, the less likely it will be that two or more third indices derived from two or more corresponding main memory addresses contain identical values. Since the set prediction RAM can hold only one prediction (index bits) per third index, the increase in the size of that third index reduces the probability of an incorrect prediction index and therefore an incorrect prediction as to the proper data RAM. The trade off is between lower latency and increased accuracy of the prediction of which data RAM contains the data needed by the CPU. The present invention provides a prediction design that recognizes that the principle of locality can be utilized to implement reduced latency in the cache memory system with accurate prediction operation.

DETAILED DESCRIPTION

Figure 1:
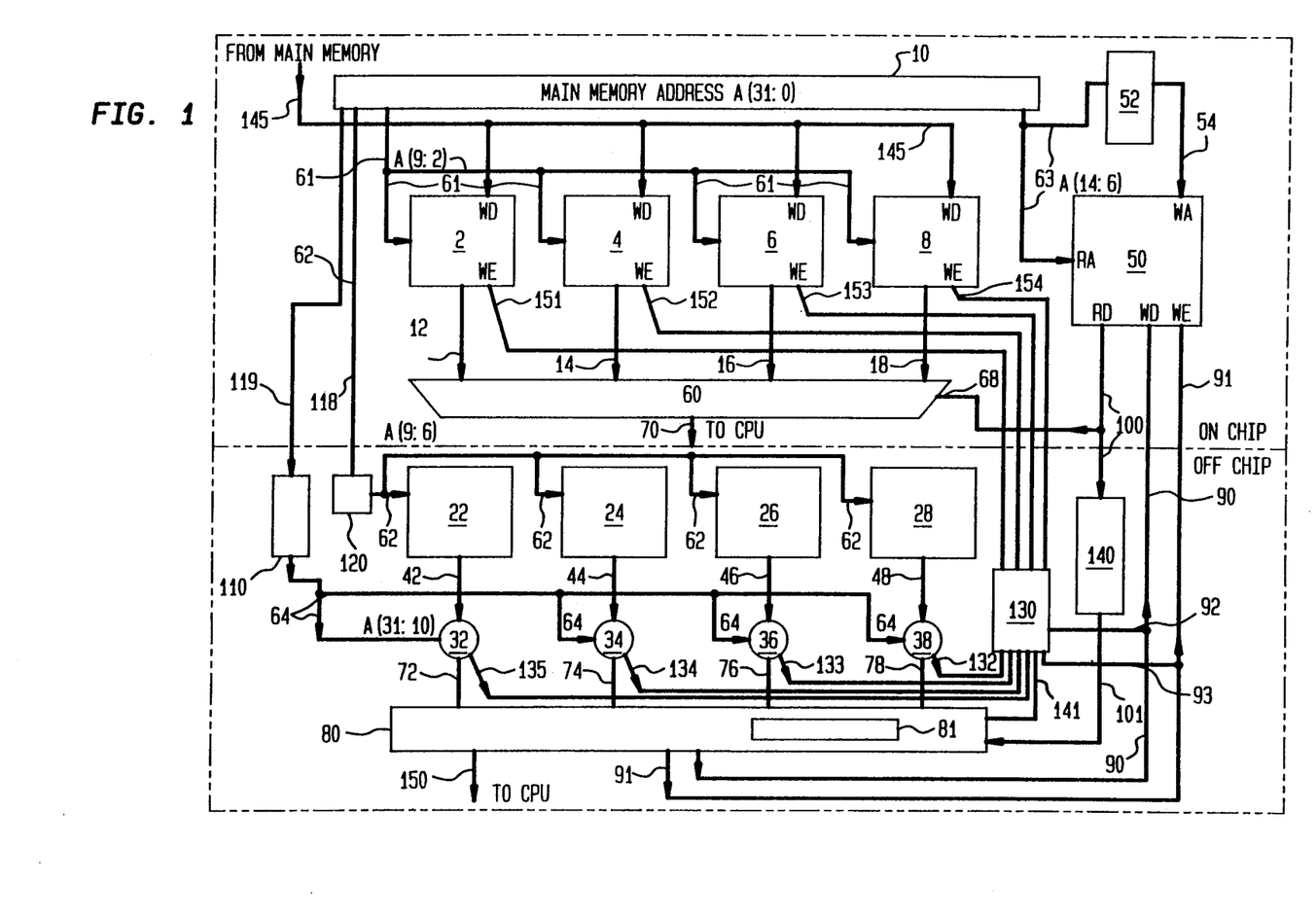
FIG. 1 is a block diagram of a cache memory system with a set prediction RAM, according to the present invention.

Referring to FIG. 1, a set-prediction cache memory system, according to the present invention comprises a plurality of data memories such as RAMs, 2,4,6,8. Each data RAM 2, 4, 6, 8 can comprise a one kilobyte RAM and includes a read data output on signal lines 12, 14, 16, 18, for output of a data item in response to a first index on signal line 61 that comprises bits <9:2> of a 32 bit main memory address 10 for a data item to be fetched. The first index on signal line 61 is input as a read address to each of the RAMs 2,4,6,8. The read data outputs on signal lines 12, 14, 16, 18 each comprise a data item within a data block stored in the respective data RAM at the location identified by the first index on signal line 61 and each output on signal line 12, 14, 16, 18 is coupled to a respective input of a data select multiplexer 60.

The set prediction cache memory system further comprises a plurality of tag stores such as tag RAMs 22, 24, 26, 28. Each tag RAM 22, 24, 26, 28 is paired with a corresponding one of the data RAMs 2, 4, 6, 8.

The tag RAMs 22, 24, 26, 28 each receive a second index on signal line 62 as a read address comprising, e.g., bits <9:6> of the main memory address 10 of the data item to be fetched and each includes a tag RAM output on signal lines 42, 44, 46, 48 coupled to a respective one of a plurality of tag store comparators 32, 34, 36, 38. Each tag output on signal line 42, 44, 46, 48 may comprise bits (31:10) of the main memory address of the data item stored in the corresponding data RAM 2, 4, 6, 8. Each of the tag store comparators 32, 34, 36, 38 also receives a tag on signal line 64 such as bits <31:10> of the main memory address 10, for the data item to be fetched. In this manner, the tag comparators 32, 34, 36, 38 can determine which data RAM output on signal lines 12, 14, 16, 18 is the data item to be fetched.

The set prediction cache memory system may also comprise an off-chip index buffer 120 to receive the second index on signal line 118 and output the second index on signal line 62 after some predetermined delay. The use of such index buffer 120 allows the system to process sequential data fetches without being constrained by the time delay necessary for the plurality of tag comparators 32, 34, 36, 38 to complete their respective tasks.

Similarly, the system may further comprise an off-chip index buffer 110 to receive a fourth index on signal line 119 and output the fourth index on signal line 64 to be input into each of the plurality of tag comparators 32, 34, 36, 38. Furthermore, the index buffer 110 also delays the fourth index by an additional predetermined period of time which approximates the latency of the plurality of tag RAMs 22, 24, 26, 28.

A prediction RAM 50 is used to store prediction indices and to output the same on signal line 100 to predict which one of the data item outputs is the one to be fetched, prior to completion of the tag comparison by the tag comparators 32, 34, 36, 38. Thus, the data item is available for use by a CPU (not illustrated) sooner than it would ordinarily be available in a conventional set associative cache memory system.

The set-prediction cache memory system further comprises a mis-predict logic device 80 which is coupled to each of the tag store comparators 32, 34, 36, 38 and to the set-prediction RAM 50. The set-prediction RAM 50 is also coupled to a state device 52 in order to update the RAM locations of the set-prediction RAM 50, as will be described below. The set prediction RAM 50 and the state device 52 each receive a third index on signal line 63 that comprises, e.g., bits <14:6> of the main memory address 10 of the data item to be fetched.

Figure 2:
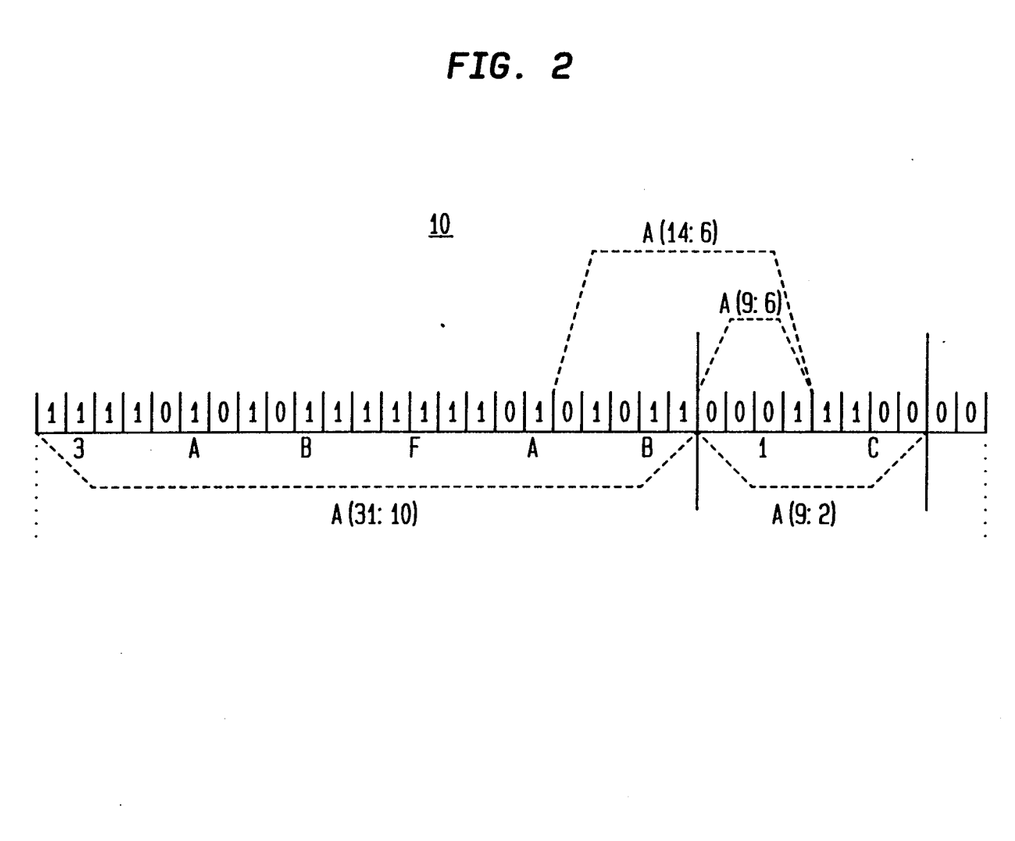
FIG. 2 is an illustration of a 32 bit main memory address.

Referring now to FIG. 2, there is an illustration of a main memory address 10 as segmented into the plurality of indices for use in the cache memory system according to the present invention. The indices of the main memory address 10 depicted in FIG. 2, are by way of example only and are not intended to restrict the first, second, third and fourth indices on signal lines 61, 62, 63 and 64, respectively to the portions shown.

The main memory address 10 depicted in FIG. 2 is a 32 bit address with bits <31:0> comprising the main memory address 10 of a byte of data. Such main memory address 10 may be segregated into a first index on signal line 61, for example, bits <9:2> comprising a predetermined first portion of the main memory address 10; a second index on signal line 62 comprising a predetermined second portion of the main memory address 10 for example, bits <9:6> of the main memory address 10; a third index on signal line 63 comprising a predetermined third portion of the main memory address 10 for example, bits <14:6> of the main memory address 10; and a fourth index in signal line 64 comprising a predetermined fourth portion of the main memory address 10, for example, bits <31:10> of the main memory address 10.

The first index on signal line 61, bits <9:2> defines two hundred fifty-six locations in each data RAM 2, 4, 6, 8 ($2^8 = 256$). Thus, each index on signal line 61 provides an address to a 4 byte data item. In other words, a 10 bit index <9:0> would normally address 1,024 one byte locations in each one kilobyte RAM 2, 4, 6, 8 ($2^{10} = 1024$). By dropping the two low order bits <1:0>, the first index <9:2> identifies 256 data items, each containing four bytes. The amount of data fetched each time can be varied as desired. For example, a first index comprising bits <9:3> would fetch one of 128 eight byte data items and so on.

The cache memory system can be organized so that sixty-four byte blocks are written into one of the data RAMs 2, 4, 6, 8 each time data is originally fetched from the main memory. Only one tag is required for each sixty-four byte data block, and therefore, each tag RAM 22, 24, 26, 28 can be smaller than the corresponding data RAM 2, 4, 6, 8 of each data RAM/tag RAM pair. For example, a one kilobyte RAM 2, 4, 6, 8 can store sixteen, sixty-four byte blocks and would need sixteen tags, one per sixty-four byte data block. Thus, the second index on signal line 62 only requires bits <9:6> to uniquely identify sixteen different tag entries, one for each of the sixteen, sixty-four byte data blocks ($2^4 = 16$). The tag for each sixty-four byte data block can comprise bits <31:10> of the main memory address of any of the sixty-four bytes in the data block.

It should be noted that bits <31:10> of the main memory address of each byte within a sixty-four byte data block would be the same and thus can be used as a tag for any byte within the sixty-four byte block. This is due to the resolution provided by the thirty-two bits of the main memory address. More specifically, bits <1:0> uniquely define each byte within a four byte data item ($2^2 = 4$) and bits <31:2> will be the same for each byte within that four byte data item. Similarly, bits <5:2> uniquely define each of the four, sixteen byte data items within a sixty-four byte block and <9:6> uniquely define one of the sixteen, sixty-four byte data blocks within a data RAM 2, 4, 6, 8, such that bits <31:10> are common to all bytes in a particular sixty-four byte data block and can be used as a tag for any byte within that item.

The third index on signal line 63 is determined by the size selected for the prediction RAM 50. Generally, the larger the size of the prediction RAM 50, the better the prediction performance in terms of prediction accuracy. The minimum size is equal to the number of data items in each data RAM 2, 4, 6, 8. Thus, when the number of data blocks loaded into each data RAM 2, 4, 6, 8 is sixteen, sixty-four byte blocks, as in our example, the prediction RAM 50 is addressable by at least bits <9:6> to provide one prediction index for each first index on signal line 64. However, the use of more bits, e.g. bits <14:6> provides greater differentiation between different main memory addresses and thus improves the performance of the prediction RAM 50.

For example, assuming each data RAM 2, 4, 6, 8 is one kilobyte in size, then there are a total of 64, sixty four byte blocks in the data RAM. A prediction RAM addressed by a third index comprising bits <11:6> contains 64 entries ($2^6 = 64$). Normally, such 64 entries would match the 64 blocks in the cache and thus the index comprising bits <11:6> would be sufficient. However, since the prediction RAM is direct mapped, different blocks may map to the same prediction RAM entry, thus preventing the prediction RAM from predicting all possible block locations in the data RAM. By providing for additional bits in the prediction RAM index there is greater resolution differentiating between blocks, thus improving the prediction RAM efficiency. Empirical studies have found that an additional 2 to 3 bits are beneficial.

The fourth index on signal line 64 comprises the tag of the main memory address the data item to be fetched from the cache memory system and can comprise bits (31:10), for the reasons described above, for comparison to the tags stored in the data RAMS, 22, 24, 26, 28.

Figure 3:
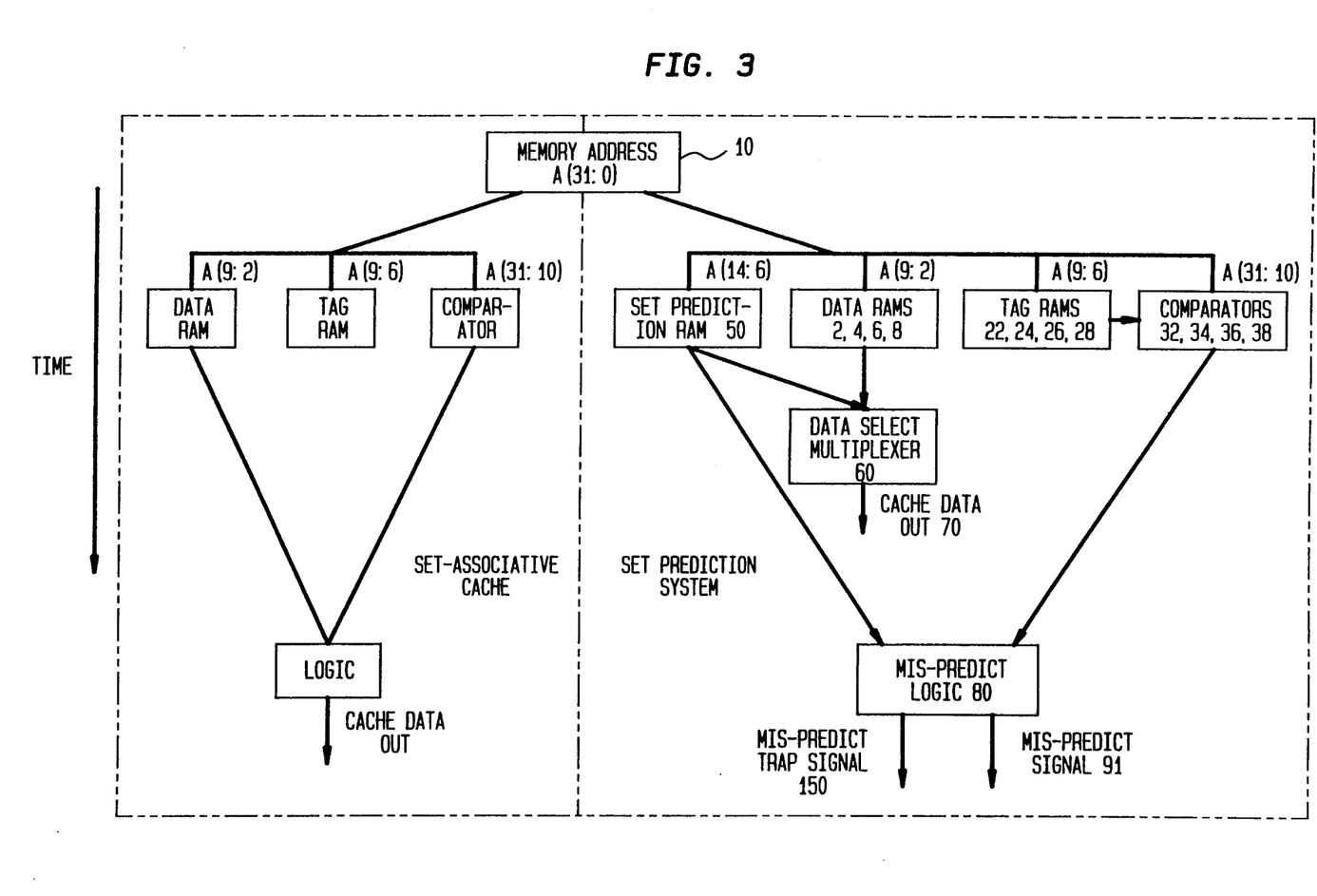
FIG. 3 is an illustration of a flow chart comparison of the set-associative cache memory system versus the set-prediction system, according to the present invention.

Referring to FIG. 3, there is illustrated a comparison flow chart between a conventional set-associative cache memory system and the set-prediction system according to the present invention. The set prediction cache memory system differs from that of the set-associative cache memory system in that the set prediction system introduces the third index on signal line 63 to facilitate the use of the set prediction RAM 50. (The third index may also be hashed such that it includes a predetermined combination of two or more portions of the main memory address 10. For example, main memory address bits <14:6> and <23:15> may be combined in a predetermined manner to produce a third index on signal line 63 to address the set prediction RAM 50.) The use of the set prediction RAM 50 to predict which one of the RAMs 2, 4, 6, 8 contains the data item identified by the main memory address 10 allows the set prediction cache memory system to circumvent the latency associated with comparison logic normally found in set-associative cache memory systems. The comparison step in each of the set-associative cache and set prediction systems involve similar latencies. As illustrated in FIG. 3, the cache data output is available for use prior to completion of the tag comparison in the set prediction cache of the present invention. The result of such circumvention is reduced access time to a data item corresponding to a predetermined main memory address 10.

Referring again to FIG. 1, the set-prediction cache memory system is arranged to receive the main memory address 10, and access a data item corresponding to the main memory address 10 for use, for example, by a CPU of a computer system. The set-prediction cache memory system comprises the plurality of data RAMs 2, 4, 6, 8, each of which is addressable by the first index on signal line 61.

The data indexed by the first index on signal line 61 in the first data cache RAM 2 comprises a first data output on signal line 12 which is input to the respective input of the data select multiplexer 60 immediately upon being retrieved from the data RAM 2. Similarly, the same first index on signal line 61 results in the second data RAM 4 retrieving a second data output on signal line 14 which is also directed to the data select multiplexer 60 immediately upon being retrieved from the second data cache RAM 4 and so on.

For each data RAM 2, 4, 6, 8 in the set-prediction system, data outputs on signal lines 12, 14, 16, 18 corresponding to the plurality of data RAMs 2, 4, 6, 8 addressed by the first index, are directed to the data select multiplexer 60 upon being retrieved from the respective one of the plurality of data RAMs 2, 4, 6, 8. The set prediction system may comprise four data RAMS 2, 4, 6, 8, or may be similarly constructed with many more, or even fewer, data RAMs.

The set-prediction system further comprises the set-prediction RAM 50 which is arranged to be indexed by the third index on signal line 63 to output the prediction index on signal line 100. The set prediction RAM 50 stores an entry for each one of the plurality of third indices such entry comprising the corresponding prediction index such that when a third index is received by the set prediction RAM 50, the set prediction RAM 50 will output the corresponding prediction index on signal line 100. The prediction index includes a plurality of bits, the number of bits being sufficient to uniquely identify each one of the data RAMs 2, 4, 6, 8 available in the set-prediction cache memory system.

The state device 52 also receives the third index on signal line 63 and holds the third index for a period of time equal to the combined latency of the look-up in each of the tag stores, the operation of the plurality of tag store comparators 32, 34, 36, 38 and the operation of the mis-predict logic device 80. The delay provided by the state device 52 allows state device 52 to input the third index on signal line 63 to the prediction RAM 50, as a write address on signal line 54, for use to update the prediction RAM 50 in the event of a mis-predict, as will be described below. This provides a mechanism to "train" the prediction RAM 50.

The data-select multiplexer 60 is arranged to receive the prediction index from the set prediction RAM 50. The prediction index controls a select line 68 to allow only the data item output on signal lines 12, 14, 16, 18 corresponding to the data RAM 2, 4, 6, 8 which is identified by the prediction index to pass through the data select multiplexer 60 to the data output 70 for further use by the CPU (not illustrated). Since the prediction index identifies only one of the plurality of data RAMs 2, 4, 6, 8, the data select multiplexer 60 acts as a gatekeeper in that it releases only the data item output on signal lines 12, 14, 16, 18 which corresponds to the prediction index. For example, should the prediction index be a 00, the data select multiplexer 60 selects the first data item output on signal line 12 from the first data RAM 2 to pass through to the CPU.

The set prediction cache memory system may further comprise an off-chip index buffer 140 to receive the prediction index on signal line 100 and output the prediction index on signal line 101. The use of the index buffer 140 allows the set prediction RAM 50 to look up a prediction index corresponding to the third index received on signal line 63 and output the prediction index such that the set prediction RAM 50 can receive another third index without having to wait for the plurality of tag RAMs 22, 24, 26, 28 and tag comparators 32, 34, 36, 38 to complete their respective tasks. The index buffer 140 may also delay the prediction index, which is output on signal line 101 to the mis-predict logic device 80, for a period of time approximating the combined latency of the plurality of tag RAMs 22, 24, 26,28 and tag comparators 32, 34, 36, 38.

The set prediction cache memory system, by using the concept of prediction indices, is capable of accessing data contained in a cache memory system with a much reduced inherent latency as a result of the direct access of one of the plurality of the data RAMs 2, 4, 6, 8 which make up the set prediction system. In essence, the set prediction cache memory system predicts that the requested data will be stored in one of the data RAMs 2, 4, 6, 8 and proceeds as though it was a direct mapped cache memory system.

As a check on its own prediction accuracy and to "train" the prediction RAM 50, the set prediction system is arranged to operate a parallel data tag compare similar to that which is utilized in a set-associative cache memory system. As a result of the need for data integrity, in addition to reduced latency, the set prediction system further comprises the plurality of the tag RAMs 22, 24, 26, 28, each corresponding to one of the data RAMs 2, 4, 6, 8.

Each of the plurality of tag RAMs 22, 24, 26, 28 is addressable by the second index on signal line 62 for output of tags on signal lines 42, 44, 46, 48, e.g., bits <31:10> of the main memory address for the corresponding data item stored in the respective data RAM 2, 4, 6, 8.

Each of the plurality of tag RAMs on signal lines 22, 24, 26, 28 directs the respective tag RAM output 42, 44, 46, 48 to a corresponding one of the plurality of tag comparators 32, 34, 36, 38. Each of the tag comparators 32, 34, 36, 38 is arranged to receive the corresponding tag RAM output on signal line 42, 44, 46 and 48 as well as the fourth index on signal line 64 comprising the tag of the main memory address of the data item required by the CPU.

Each of the tag comparators 32, 34, 36, 38 will compare the fourth index received from signal line 64 to respective tag RAM output on signal lines 42, 44, 46, 48 received from a respective one of the tag RAMs 22, 24, 26, 28. A hit or miss signal on signal lines 72, 74, 76, 78 is output from each of the tag comparators 32, 34, 36, 38 to the mis-predict logic device 80. For example, the first tag comparator 32 receives a first tag RAM output 42 from the first tag RAM 22 and compares such first tag RAM output with the fourth index and, as a result, will output either a hit or a miss. A hit signifies that the first tag RAM output is identical to the fourth index on signal line 64. A miss would conversely indicate that the first tag RAM output on signal line 42 was not the same value as the fourth index. At most, only one of the comparators 32, 34, 36, 38 will output a hit signal since the data item required by the CPU will be in only one of the data RAMs 2, 4, 6, 8. If the data item required by the CPU is not in the cache memory system, all of the comparators 32, 24, 36, 38 will output a miss signal and the data item would have to be fetched from the main memory. Known trap logic can be implemented to accomplish a fetch from main memory.

When the 64 byte block of data is retrieved from main memory, the set prediction system must decide which data RAM 2, 4, 6, 8 will store the data block. Rather than simply choose randomly among the data RAMs 2, 4, 6, 8, the set prediction system provides for the implementation of a replacement algorithm. The replacement algorithm seeks to reduce the number of times that both the data items within data blocks of the data RAMs 2, 4, 6, 8, and the corresponding prediction index in the set prediction RAM 50, are written over. In such cases, a secondary comparison is performed in each of the plurality of tag comparators 32, 34, 36, 38. The secondary comparison comprises a comparison of, for example, bits <14:10> of the tag RAM output on signal lines 42, 44, 46, 48 with bits <14:10> of the fourth index received by the tag comparators 32, 34, 36, 38 which resulted in the plurality of miss signals on signal lines 72, 74, 76, 78.

The result of such a comparison may be one of three possibilities, in the framework of the present invention: (1) only one of the tag comparators 32, 34, 36, 38 yields a match; (2) more than one tag comparator 32, 34, 36, 38 yield a match; and (3) all tag comparators 32, 34, 36, 38 yield a mismatch.

A state device 130 may be employed to determine which of the three possible scenarios exists, such state device 130 being enabled by a cache miss status signal on signal line 141 from the mis-predict logic device 80.

Each of the tag comparators 32, 34, 26, 38 sends a match or mismatch signal on respective signal lines 135, 134, 133, 132 to the state device 130. Based on the signals received, the state device will do one of the following: (1) if only one of the tag comparators 32, 34, 36 38 yields a match, the state device 130 sends a write enable signal (WE) on a corresponding one of a plurality write enable lines 151, 152, 153, 154. Write enable line 151 corresponds to tag comparator 32 and extends from the state device 130 to the data RAM 2. Write enable line 152 corresponds to tag comparator 34 and extends from the state device 130 to the data RAM 4, and so on as a result, the state device 130 sends the write enable signal on the write enable signal line 151, 152, 153, 154 which corresponds to the data RAM 2, 4, 6, 8 yielding the match; (2) if more than one tag comparator 32, 34, 36, 38 yield a match, the state device 130 is arranged to randomly choose one of the comparators 32, 34, 36, 38 yielding the match, and send the write enable signal to the corresponding data RAM 2, 4, 6, 8 along the corresponding one of the write enable signal lines 151, 152, 153, 154; (3) if all tag comparators 32, 34, 36, 38 yield a mismatch, the state device 130 is arranged to randomly choose one of the data RAMs 2, 4, 6, 8 and send a write enable signal on the write enable signal line 151, 152, 153, 154 corresponding to the chosen data RAM 2, 4, 6, 8.

Subsequent to the state device 130 determining which of the comparators 32, 34, 36, 38 yielded a match in the secondary comparison, the state device 30 sends a write enable signal (WE) on write enable signal line 93 which couples to signal line 91, such write enable signal being input into the set prediction RAM 50. The state device 130 then sends a write data signal (WD) on write data signal line 92, which couples to signal line 90, such write data signal being inputted into the set prediction RAM 50. The write data signal which comprises a bit sequence corresponding to one of the data RAMs 2, 4, 6, 8 is then stored in the set prediction RAM 50 at the location addressed by the write address (WA) on signal line 54, which is input into the set prediction RAM 50.

The mis-predict logic device 80 is arranged to receive the prediction index on signal line 101 from the set prediction RAM 50 as well as the plurality of tag comparator hit or miss signals on signal lines 72, 74, 76, 78. The mis-predict logic device 80 includes a mis-predict circuit 81 arranged to ascertain whether the prediction index on the signal line 101 corresponds to the same one of the tag RAMs 22, 24, 26, 28 which contains the tag RAM output on signal lines 42, 44, 46, 48 that matches the fourth index on signal line 64. If the correspondence is correct, nothing happens, as the prediction RAM 50 provided the correct data block to the CPU However, if the correspondence is incorrect, the mis-predict logic circuit 81 will output a correction signal on signal line 90 that comprises the number of the tag comparator 32, 34, 36, 38 that indicated a hit. The correction signal on signal line 90 is input as write data (WD) to the prediction RAM 50.

In addition to the correction signal on signal line 90, the mis-predict logic device 80 outputs a write enable signal on signal line 91 coupled to a write enable (WE) port of the prediction RAM 50. In case of a misprediction, the write enable signal 91 enables the set-prediction RAM 50 to accept the correction signal on signal line 90 as write data (WD). The write data (WD) is written to the location within the prediction RAM 50 indexed by the write address (WA) on signal line 54. As described above, the write address comprises that the index on signal line 63 originally input to the state device 52 and delayed by the latency of the tag RAM look-up and tag comparison operation to provide a write address at the proper time to update or "train" the prediction RAM 50.

If the mispredict logic device 80 detects a misprediction, a mis-predict trap signal on signal line 150 serves notice to the CPU that it should return to the step in the sequence of operations which resulted in the mispredict situation. In addition, this mispredict trap may trigger the CPU to re-initiate its request for the data item which resulted in the set prediction system producing that mispredict trap signal after the trap.

The set prediction system only experiences logic-induced latency when its comparators 32, 34, 36, 38, in conjunction with the mis-predict logic device 80, detect an incorrect prediction index on signal line 100. The set prediction system may experience set-associative like delays only when the set prediction RAM 50 predicts the incorrect one of the plurality of data RAMs 2, 4, 6, 8.

An alternative embodiment of the present invention may comprise using a single tag RAM, addressable by a predetermined combination of the second index with the prediction index. For example, a two bit prediction index corresponding to one of the plurality of data RAMs 2, 4, 6, 8 can, in the embodiment, be tacked on to the most significant bit of the second index, to create an index which is capable of addressing an increased number of data items in the tag RAM. This alternative embodiment will treat all mispredicts as cache misses.

What is claimed is:

1. A data storage system comprising:
   a plurality of directly mapped cache data RAMs for electronically storing data items;
   each of the directly mapped cache data RAMs including an address input to receive a data-RAM index derived from a main memory address and to output a data item in response to input of the data-RAM index;
   a prediction mechanism for receiving a prediction-RAM index derived from a first plurality of bits of the main memory address for use in predicting a location of a particular data item addressed by the main memory address in one of the plurality of directly mapped cache data RAMs and outputting a prediction index comprising a second plurality of bits of the main memory address in response to the prediction-RAM index to predict one of said plurality of directly mapped cache data RAMs as containing the data item addressed by the main memory address;
   a data-select multiplexer having a select input, a set of data item inputs and a data item output and arranged to receive the data items output from said plurality of directly mapped cache data RAMs at the set of data item inputs, to receive the prediction index from said prediction mechanism at the select input, and to select the data item output by one of said plurality of directly mapped cache data RAMs in response to the prediction index applied to the select input for output, at the data item output, of the data item from the one of said plurality of directly mapped cache data RAMs predicted by the prediction index so that a data item is output prior to completion of a comparison operation to determine whether the particular data item is contained in one of the plurality of directly mapped cache data RAMs.

2. The data storage system of claim 1 wherein said prediction mechanism comprises a set prediction RAM arranged to store a plurality of said prediction indices.

3. The data storage system of claim 2 wherein:
   each of said plurality of data RAMs is addressable by a data-RAM index comprising a second predetermined portion of the main memory address;
   each of a plurality of tag RAMs is addressable by a tag-RAM index comprising a third predetermined portion of the main memory address; and said set-prediction RAM is addressable by a prediction-RAM index comprising a fourth predetermined portion of the main memory address. indices.

4. The data storage system wherein said mis-predict logic device comprises a circuit arranged to compare said prediction index with one of said plurality of tag comparator, signals and:
   if said prediction index corresponds to the one of said plurality of tag comparator signals comprising a hit, said mis-predict logic device does not output a mis-predict signal; and
   if said prediction index does not correspond to the one of said plurality of tag comparator signals comprising a hit, said mis-predict logic device outputs a mis-predict signal.

5. The data storage system of claim 4 wherein said mis-predict logic device, upon said comparison of said prediction index with said tag comparator signal comprising a hit yielding a mismatch, outputting a mis-predict trap signal to a CPU.

6. The data storage system of claim 4 wherein said mis-predict logic device, upon a determination that the one of said plurality of tag comparator signals comprising a hit does not correspond to said prediction index, outputs a write enable signal.

7. A data storage system comprising:
a plurality of directly mapped cache data RAMs for electronically storing data items;
each of the directly mapped cache data RAMs including an address input to receive a data-RAM index derived from a main memory address and to output a data item in response to input of the data-RAM index;
a prediction mechanism for receiving a prediction-RAM index derived from the main memory address for use in predicting a location of a particular data item addressed by the main memory address in one of the plurality of directly mapped cache data RAMs and outputting a prediction index in response to the prediction-RAM index to predict one of said plurality of directly mapped cache data RAMs as containing the data item addressed by the main memory address;
a data-select multiplexer having a select input, a set of data item inputs and a data item output and arranged to receive the data items output from said plurality of directly mapped cache data RAMs at the set of data item inputs, to receive the prediction index from said prediction mechanism at the select input, and to select the data item output by one of said plurality of directly mapped cache data RAMs in response to the prediction index applied to the select input for output, at the data item output, of the data item from the one of said plurality of directly mapped cache data RAMs predicted by the prediction index so that a data item is output prior to completion of a comparison operation to determine whether the particular data item is contained in one of the plurality of directly mapped cache data RAMs;
a plurality of tag RAMs electronically storing tag data further comprising a plurality of tag RAM outputs, each one of said plurality of tag RAMs paired with one of said plurality of data RAMs;
a plurality of tag comparators, each one of said plurality of tag comparators arranged to receive and compare a tag RAM output from one of said plurality of tag RAMs, and a tag comparator index comprising a first predetermined portion of a main memory address; and wherein said prediction mechanism further comprises a mis-predict logic device arranged to receive said prediction index from a set-prediction RAM and a tag comparator signal from each of said plurality of tag comparators.

8. The data storage system of claim 7 further comprising a state device coupled to said set prediction RAM and arranged to receive said prediction-RAM index, said state device outputting said prediction-RAM index after a predetermined hold-up time.

9. The data storage system of claim 8 wherein said predetermined hold-up time is greater than or equal to a period of time required by one of said tag comparators to compare said tag comparator index with said tag RAM entry.

10. The data storage system of claim 8 wherein said set prediction RAM is arranged to receive said write enable signal from said mis-predict logic device; said outputted prediction-RAM index from said state device; and said mis-predict logic signal from said mis-predict logic device, said set prediction RAM, upon receipt of said write enable signal replacing existing data addressed by said prediction-RAM index with updated data comprising said mis-predict logic signal.

11. A method of storing and retrieving data comprising the steps of:
receiving a plurality of data blocks, each comprising a plurality of data items, in a plurality of cache data RAMs with each data item being received in a preselected one of the data RAMs;
receiving in each of the plurality of data RAMs a data-RAM index comprising a first predetermined plurality of bits of a main memory address;
outputting a data item from each of the plurality of data RAMs in response to the data-RAM index;
receiving in a set prediction RAM, a prediction-RAM index comprising a second predetermined plurality of bits of the main memory address;
in response to the prediction-RAM index, outputting from the set prediction RAM a prediction index corresponding to one of the plurality of data RAMs and representing a prediction that the one of the plurality of data RAMs contains a particular data item addressed by the main memory address;
providing a data-select multiplexer having a select input, a set of data item inputs and a data item output;
receiving the prediction index at the select input of the data-select multiplexer;
receiving at the data item inputs of the data-select multiplexer, each of the data items output by the plurality of data RAMs;
selecting one of the data items at the data item inputs of the data-select multiplexer for output at the data item output of the data-select multiplexer in response to the prediction index input to the select input, to output the data item predicted to be the particular data item so that a data item is output prior to completion of a comparison operation to determine whether the particular data item is contained in one of the plurality of directly mapped cache data RAMs.

* * * * *